United States Patent
Talati et al.

(10) Patent No.: US 7,234,056 B2
(45) Date of Patent: Jun. 19, 2007

(54) METHOD AND APPARATUS FOR DOWNLOADING EXECUTABLE CODE IN A NON-DISRUPTIVE MANNER

(75) Inventors: Naresh Talati, Voorhees, NJ (US); Anton Bodner, Jr., Turnesville, NJ (US)

(73) Assignee: Inrange Technologies Corp., Lumberton, NJ (US)

(*) Notice: Subject to any disclaimer, the term of this patent is extended or adjusted under 35 U.S.C. 154(b) by 386 days.

(21) Appl. No.: 10/252,430

(22) Filed: Sep. 24, 2002

(65) Prior Publication Data

US 2004/0060047 A1    Mar. 25, 2004

(51) Int. Cl.
G06F 9/00 (2006.01)
(52) U.S. Cl. .......................................... 713/100; 713/1
(58) Field of Classification Search ................. 717/168
See application file for complete search history.

(56) References Cited

U.S. PATENT DOCUMENTS

| 5,155,837 | A | | 10/1992 | Liu et al. |
|---|---|---|---|---|
| 5,339,430 | A | | 8/1994 | Lundin et al. |
| 5,359,730 | A | * | 10/1994 | Marron ........................ 717/169 |
| 5,410,703 | A | * | 4/1995 | Nilsson et al. .............. 717/168 |
| 5,437,025 | A | * | 7/1995 | Bale et al. ............... 707/103 R |
| 5,555,418 | A | * | 9/1996 | Nilsson et al. .............. 717/153 |
| 5,682,533 | A | * | 10/1997 | Siljestroemer .............. 707/200 |
| 5,938,766 | A | * | 8/1999 | Anderson et al. ........... 713/100 |
| 6,101,327 | A | | 8/2000 | Holte-Rost |
| 6,151,620 | A | * | 11/2000 | Madsen et al. ............. 709/204 |
| 6,314,567 | B1 | * | 11/2001 | Oberhauser et al. ........ 717/170 |
| 6,463,584 | B1 | | 10/2002 | Gard et al. |
| 6,507,572 | B1 | * | 1/2003 | Kumar et al. ................ 370/335 |
| 6,634,025 | B1 | * | 10/2003 | Hauptmann et al. ........ 717/168 |
| 6,698,017 | B1 | * | 2/2004 | Adamovits et al. ......... 717/168 |
| 2004/0019752 | A1 | * | 1/2004 | Burton et al. ................ 711/154 |

* cited by examiner

Primary Examiner—Rehana Perveen
Assistant Examiner—Tse Chen
(74) Attorney, Agent, or Firm—Beck + Tysver, P.L.L.C.

(57) ABSTRACT

A method and apparatus for achieving a non-disruptive code load that includes assigning an endpoint to a non-disruptive code loading new process, loading the process into a memory location of a system and starting the process, wherein a previous process is instructed to forward all messages on its queue to the new process to where all new signals are processed.

12 Claims, 3 Drawing Sheets

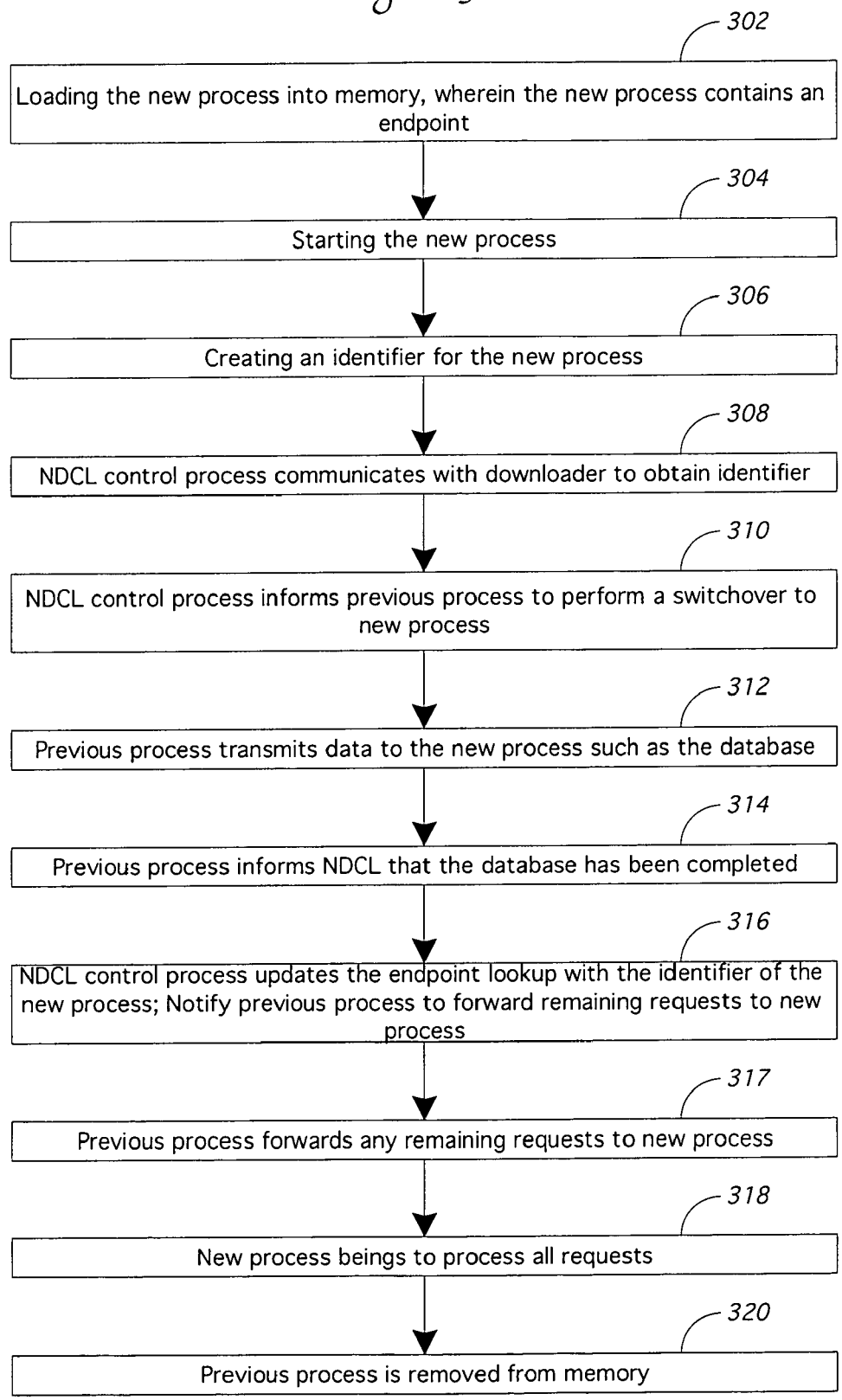

METHOD AND APPARATUS FOR DOWNLOADING EXECUTABLE CODE IN A NON-DISRUPTIVE MANNER

FIELD OF THE INVENTION

The present invention relates generally to downloading software code onto a computer hardware device. More particularly, the present invention relates to downloading software code to an active hardware device, which is part of the system, such that the active hardware device is available to the rest of the system, all the time and hence software upgrade does not disrupt the system operation.

BACKGROUND OF THE INVENTION

The field of computer technology advances at almost a lightning pace. Equipment rarely has more than a five-year life. In most instances, the life is only two to three years. In some instances, it is possible to replace various pieces of the equipment. In other instances, all that is required is an upgrade of the firmware or software. The problem arises when other system devices communicating with the system device being upgraded, cannot tolerate even a few milliseconds of unavailability of the system device, under upgrade. Failure to do so, may results in system failure and hence significant down time. Computer equipment owners demand near perfect operation of their equipment. Owners talk in terms of anything less than 99.999% availability as being unacceptable.

Shutting down a computer system can cost a company thousands and thousands of dollars for each hour the system remains unavailable. Upgrades of computer equipment usually result in some downtime of the processing. This has resulted in technology assistants upgrading equipment at odd hours of the morning. This results in additional costs to the company as well.

Software upgrades on larger computer systems are needed to add additional features or fix reoccurring problems or bugs. In light of the financial consequences of shutting down a computer, there is a need to upgrade firmware without disrupting the processing time. Prior systems involve halting the real-time system, while the upgrade in code is performed, which may require halting the complete system due to other system devices requiring immediate response from the system device under upgrade. This is not ideal for the aforementioned reasons. Furthermore, the owner of the equipment is less reluctant to perform upgrades or fix bugs unless absolutely necessary.

Accordingly, it is desirable to provide an apparatus and method that enables the owner of computer systems to upgrade the software of one of their devices to add new features or fix software bugs, in a way so that the device being upgrade is always available to other system devices. This in turn will allow the computer system to run or operate in real time and continue to process requests.

SUMMARY OF THE INVENTION

It is therefore a feature and advantage of the present invention to provide a method and apparatus for downloading a new version of executable software code onto a system without the need to bring the system to a halt.

It is another feature and advantage of the present invention to provide a fast and efficient means of processing time to upgrade a process or thread.

The above and other features and advantages are achieved through the use of a novel endpoint identification tag that is attached to every process, an endpoint process table that permits all processes to communicate with each other, and to enable the new process to eventually replace the previous process as herein disclosed. It is important to note that the new process and the previous process it replaces have the same endpoint.

In accordance with one embodiment of the present invention, a method for non-disruptive code loading includes the steps of loading a new process into memory, wherein the new process includes an endpoint (same as the process it is replacing), starting the new process and creating an identifier for the new process.

A further step to this method can include recording of the identifier by a downloader, whereby a control process eventually requests and obtains the new process identifier. The identifier is used to enable the previous process and the new process to communicate to one another. The inclusion of an identifier and an endpoint for the new process results in the building of an endpoint lookup table, which results in the step of looking up the endpoint of the process to enable processes to communicate with each other.

In a further aspect of this embodiment, a previous process sends or transmits update signals to the new process to update its internal database. These signals include the process identification numbers among other information to enable the new process to execute and operate as the previous process. While the update signals are being transmitted, the previous process continues to process and service requests that are received on the queue of the previous process. Once the complete database has been sent, the step of alerting the control process about the completion of transmission of the database is accomplished. Further steps include forwarding any remaining requests to the new process queue, in response to the database being transferred, and processing update signals received by the new process queue. When the new process begins to execute and process all the requests for the system, the previous process can be deleted or removed to help alleviate any memory problems that might occur.

In another aspect of this invention, the update signals transferred between the new and previous process remain approximately the same between code revisions.

In an alternate embodiment of the present invention, an apparatus for loading code non-disruptively includes means for loading a new process into memory, wherein the new process comprises an endpoint, means for starting the new process and means creating an identifier for the new process. This alternate embodiment can further include means for recording the identifier by means for downloading and means for obtaining the identifier for a control process.

In another aspect of this alternate embodiment, additional elements are means for instructing a previous process to perform a non-disruptive switchover to the new process, which is accomplished by a control process. At the instruction to perform a non-disruptive switchover, means for transmitting communicates the identifier to the new process. After some further communication between the new and previous process, means for notifying instructs the control process that the database has been transferred to the new process. Once the endpoint lookup table is updated by replacing the endpoint entry, containing the identification number of the previous process with the identifier of the new process, all communication from other processes are directed to the new process. This is transparent to the other processes, since they send the message to the same end point.

Once the new process is activated, the previous process instructs means for forwarding to transmit any remaining messages to a queue of the new process, where the new process begins to process requests.

In a further embodiment of this invention, an apparatus for loading code non-disruptively includes an operating system that generates an identifier for a new process, wherein the new process includes an endpoint, a memory device linked to the operating system, wherein the memory device receives the new process, a lookup table that includes both the identifier and endpoint of the new process, wherein the lookup table is in communication involving other processes. The controller or control process informs a previous process to perform a non-disruptive switchover to the new process. The apparatus can further include a downloader linked to the memory device, wherein the new process is received by the downloader and placed in the memory device.

In another aspect of this embodiment, signals are sent between the old process and the new process. The signal can include the database of the previous process and the identifier of the new process.

Once the database is transferred to the new process, the control process is alerted to this occurrence. In the endpoint lookup table, an identification number entry for the previous process's end point is replaced by the new process's identification number.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 3 is a block diagram of an alternate embodiment of the present invention.

DETAILED DESCRIPTION OF PREFERRED EMBODIMENTS OF THE INVENTION

A preferred embodiment of the present invention provides an apparatus for downloading executable code to a system device and running or executing it after download, in a manner that the system device being upgraded is always available to other system devices. This allows the system to continue to operate without the need to sacrifice valuable processing time.

A general operating system supports multithreads of execution to create a multi-tasking environment. The operating system OSE from Enea of Sweden refers to these multi-threads as processes. OSE operating system categorizes processes into categories such as dynamic, and static. The dynamic process, supported by OSE, is a focal point of this invention. The dynamic process, according to OSE, is a process that can be dynamically created and then destroyed. In other words, it is possible to create or spawn a process and then at a later point in time delete this process.

The present invention focuses on two types of dynamic processes, (i) loadable; and (ii) persistent. This invention does not allow persistent process to be non-disruptively loaded and started. All OSE processes are persistent. User processes can be loadable or persistent. On the other hand, loadable processes are capable of being non-disruptively loaded and started. The following is a breakdown of the hierarchy of the processes:

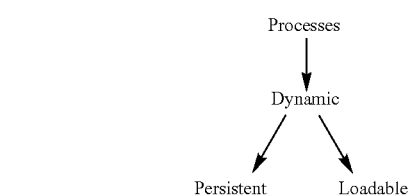

Figure 1:
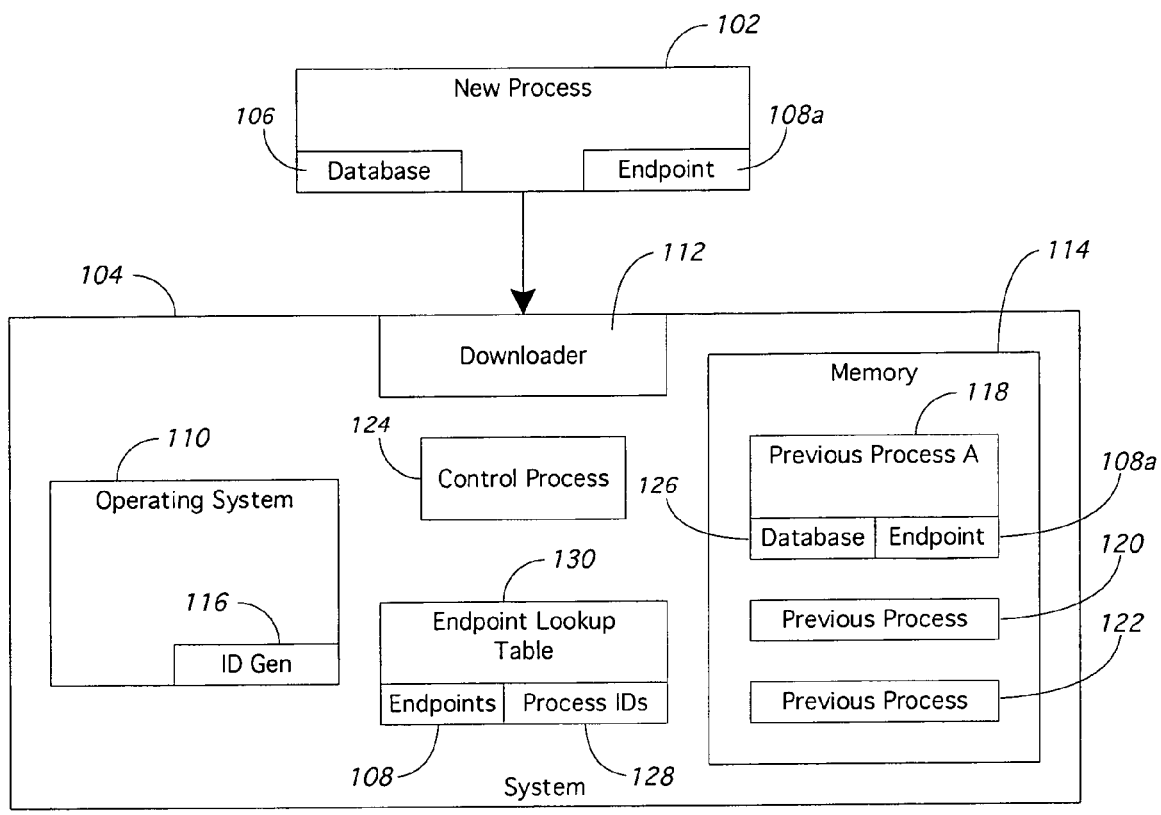
FIG. 1 is a block diagram illustrating several elements of a preferred embodiment of the present invention.

FIG. 1 is a block diagram illustrating several elements of a preferred embodiment of the present invention. A new or upgraded process 102 is compiled outside of the system 104. The new process 102 is comprised with an endpoint 108a (same as endpoint 108a of previous process 118) and a database 106. The endpoint 108 is in addition to the process identification that is generated by the operating system executable code 110. In the present invention the operating system executable code 110 can be the OSE operating system.

The new process 102 is downloaded into the system 104 via the downloader 112 to eventually replace process A 118. In the present invention, the downloader 112, can be the dynamic program-loading feature of OSE. The downloader 112 allows a user to load the new process 102 or code into memory 114 without disrupting currently running processes.

Any process loaded or currently located in the OSE operating system is identified by its identifier or process ID code. The identifier is a unique number to identify a particular process. The identifier is assigned and created by the OSE operating system when the process is loaded and executed into the system device 104. The identifier cannot be user specified.

In the OSE operating system, each process has one input queue to receive signals. The signal is a message containing information that usually results in work for the process. In other words, the signal is a request for the process to perform a certain function. Since there is only one input queue to receive signals, there is only one input queue per process. The same identifier is also used to identify the input queue of a process.

The current invention places an additional layer on top of the OSE operating system's identifier to identify processes and queues. This layer is labeled as an endpoint 108. The endpoint 108 is created at the time the new process 102 is compiled and not by the OSE operating system or the operating system executable code 110. The endpoint 108 enables the previous processes 118, 120, 122 to communicate with one another. The endpoint 108, as an identifier, is unique for a given process, but is similar if not the same for previous and new versions of the process. The similarity of the endpoints ensures seamless upgrading of the process. Processes already resident in the system are not required to obtain a new endpoint for the upgraded process. One of the differences between the identifier and the endpoint 108 is that the endpoint 108 is determined at compile time rather than at runtime and the identifier is generated at runtime.

The OSE processes and the new process 102 communicate with each other through the use of the identifier. It is not necessary to alter this communication mechanism because the OSE processes are not capable of being non-disruptively upgradeable. Furthermore, if an OSE process communicates to a new process 102 on a regular basis, that new process 102 becomes persistent and then is unable to be non-disruptively upgraded. In the present invention, only a small percentage of the previous processes 120, 122 are or become persistent. As mentioned before, new process 102 will eventually replace process A 118.

The new process 102 includes a database 106 and an endpoint 108. The database 106 can be initially set at the default setting or can be left blank. The new process 102 is received by the downloader 112, which is part of the system 104. The downloader 112 places the new process 102 into memory 114. At this point, the process 102 is started or executed by the OSE operating system 110. Additionally, the OSE operating system 110 generates an identifier with the ID generator 116.

The new process 102 is loaded into memory 114 where it is then executed to eventually replace or upgrade the previous process A 118. As stated previously, the new process 102 includes an endpoint 108, which is generated at compile time of the executable code, and a database 106 that is, after creation, set to a default setting or empty.

Once the new process 102 is loaded into memory 114, the ID generator 116 of the operating system 110 generates an identifier for the new process and placed into the database 106. A non-disruptive code load (NDCL) control process 124 or controller then communicates to the downloader 112 to obtain a list of new identifiers. The NDCL control process 124 informs previous process A 118 to perform a non-disruptive switchover to the new process 102. Contained in this signal payload is the identifier of the corresponding loadable new process 102. The passing or communicating of the identifier of the new process 102 to the previous process 118 allows these two processes to communicate with each other directly without the need to update the endpoint lookup table.

The previous process 118 transmits data to the new process 102 to enable the new process 102 to update its database 106. In the present invention, these update signals are not altered during code revisions. This enables the update signals to be translated by any version of new process.

The new process 102, upon receiving the update signals, updates its database 106. During this period of time, the new process 102 does not receive any requests from other sources to perform certain functions. The previous process 118 continues to service and process new requests as it sends update signals to the new process 102. Furthermore, the previous process 118 sends new update signals as its own internal database 126 is altered or changed from new requests from other processes.

Once the previous process A 118 has completed the database transfer, the previous process A alerts the NDCL control process 124. At this point in time, the database 106 of the new process 102 is sufficiently similar to the database 126 of the previous process 118 such that the new process can seamlessly function as the previous process. The NDCL control process 124 then proceeds to update an endpoint lookup table 130 with the identifier 128 of the new process 102 replacing the identifier 128 of the previous process A 118. Furthermore, the previous process A 118 forwards any remaining work on its queue to the new process 102. From this point forward, all new work or requests are being directed to the new process 102. The previous process A 118 can be deleted to free additional memory in the system 104. As previously stated, the endpoint 108a for the previous process 118 and new process 102 ramains similar if not identical through an upgrade. The endpoint lookup table 130 completes the conversion for other processes to communicate with the upgraded process. In other words, the processes already resident in a system specify an upgradeable process by a known endpoint 108. This request to communicate with the other process by identifying the endpoint 108 is then received by the endpoint lookup table 130, which in turn identifies the new process 102 by its identifier. The step of updating the process identifier 128 in the endpoint lookup table 130 for an upgraded process bypasses each process having to know the process identifier 128 of pervious and new processes as well as ensuring a fast and efficient means for a nondisruptive code load.

Note that it is possible for processes to be in different formats because of differing code versions. However, these processes are still able to communicate with each other. The new process 102 is both forward and backward compatible with the differing code revisions in order to communicate and transfer data.

Figure 2:
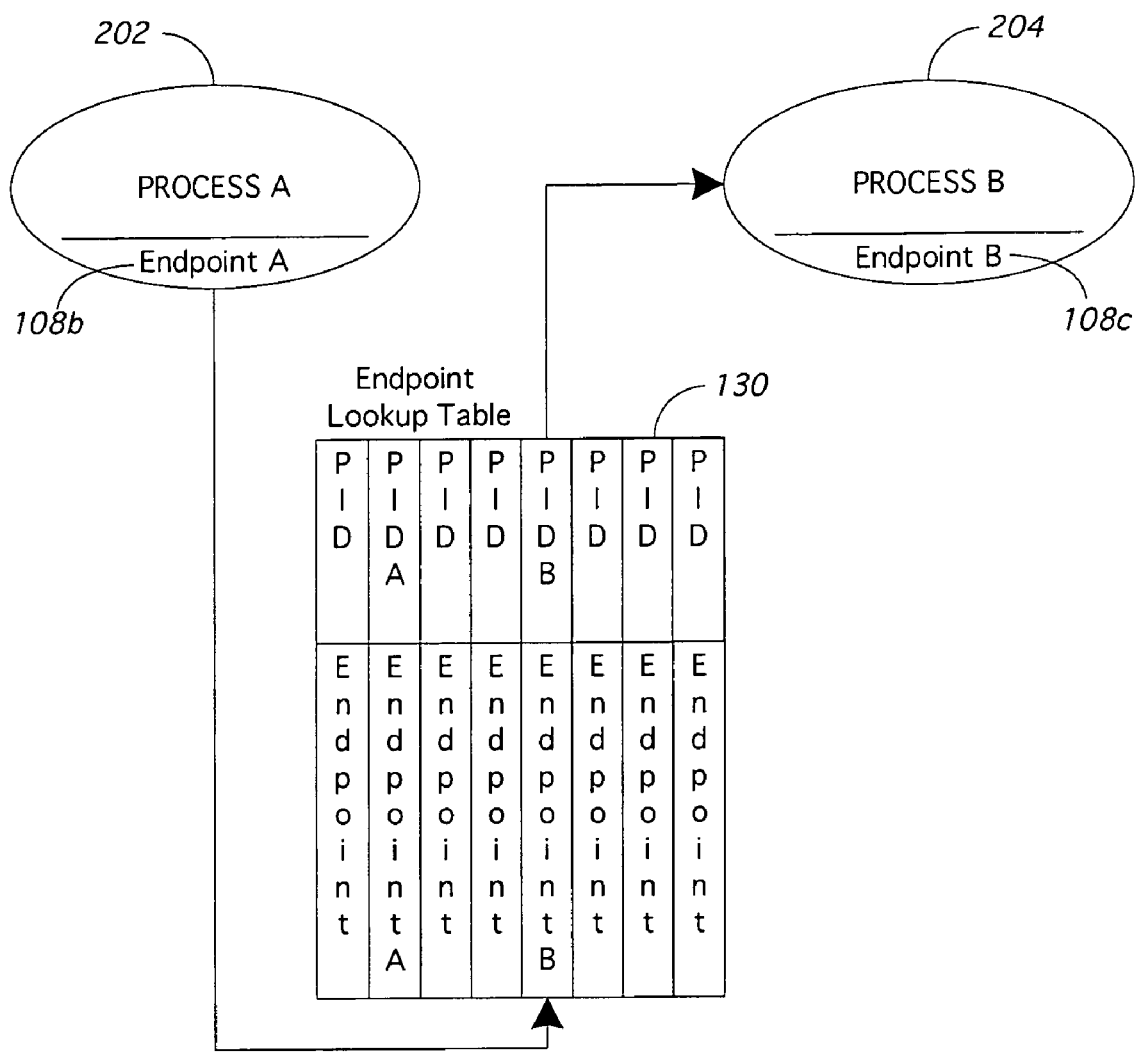
FIG. 2 is a diagram illustrating specific elements of the preferred embodiment.

FIG. 2 is a diagram illustrating the specific elements of the preferred embodiment. Consider a running system that includes both persistent and loadable processes running. All processes are communicating to each other by the use of signals being placed on their receive queues. The OSE operating system identifies queues by their identifier. The present invention places an additional identification layer on top of the OSE operating system identifier to enable processes to identify specific processes and queues. This new layered identification is called an endpoint 108 and is the way processes, loadable and persistent, communicate with each other.

If an existing process A 202 needs to send a message to an existing process B 204, then process A 202 specifies the endpoint 108c of process B 204. The process A 202 proceeds to lookup the endpoint 108c in the endpoint lookup table 130. Once the endpoint 108c of process B 204 is discovered, the endpoint 108c is translated into a process identifier 128 and then the message from process A 202 is routed to the process B 204. The endpoint lookup table 130 is comprised of all the identifiers 128 for the processes. The endpoint lookup table 130 allows processes to free up memory space by letting one central location store the common information. This centralization is also useful for updating such that only one table needs to be updated and thus there are no race conditions. In FIG. 2, the endpoint 108b of process A 202 is not the same endpoint 108c of process B 204. FIG. 2 illustrates the perferred embodiment of communication between two loadable processes.

FIG. 3 is a block diagram of an alternate embodiment of the present invention. FIG. 3 is a block diagram illustrating a method of the present invention. This alternate embodiment is begun with the step 302 of loading a new process 102 into memory 114. The new process contains at the minimum an endpoint 108. The next step 304 involves starting or executing the new process 102. At this point, the new process 102 is present in memory 114 but not processing requests or messages. The OSE operating system 110 initiates the step 306 of creating an identifier for the new process 102 once the new process 102 or executable code is loaded into memory 114.

Once loaded into memory 114, an NDCL control process 124 begins the step 308 of communicating with the downloader 112 to obtain the identifier of any and all new processes 102. The NDCL control process 124 performs the step 310 of informing the previous process 118 to initiate a switchover the new process 102. After the previous process 118 receives this request, the previous process 118 begins the step 312 of transmitting data to the new process 102. The data can be the internal database 126 of the previous process 118. The new process 102 uses this data to update its database 106 in preparation for replacing the previous process 118. Once all the data has been transmitted by the previous process 118, the previous process 118 performs the step 314 of informing the NDCL control process 124 that the database has been transferred. In response, the NDCL control process 124 executes the step 316 of updating the endpoint look table 130 with the endpoint 108 of the new process 102. After which, NDCL control process 124 informs pervious process 118 to forward all remaining requests on its queue to new process 102. Previous process 118 executes step 317 and carries out the fowarding of all pending requests on its queue to the new process 102. At this point, the new process 102 begins the step 318 of processing all requests. The NCDL control process 124 can perform the step 320 of removing the previous process 118 from memory 114.

It is also contemplated by the present invention to upgrade interrupt handlers in a non-disruptive fashion. This is possible because the interrupt handlers are called or retrieved from a vector table. The current implementation of OSE requires that during the upgrade of the interrupt handlers that the interrupts be disabled when changing the function point in the vector table. The preferred embodiment implements the upgrading of interrupts by disabling the interrupts. However, the invention is not limited to such a configuration. One of ordinary skill in the art recognizes that it is possible to implement the present invention without the need to disable interrupt. With the present invention, this period of time when the interrupts are disabled is exceedingly fast, less than 500 microseconds. During this time, the hardware interrupts are stacked. When the interrupt handlers are upgraded, the interrupts are handled by the new handlers. The interrupt handlers do not have internal databases, so there is no need to synchronize old and new code.

The many features and advantages of the invention are apparent from the detailed specification, and thus, it is intended by the appended claims to cover all such features and advantages of the invention, which fall within the true spirits, and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method for non-disruptively substituting a second process for a first process, comprising the steps of:
   a. operating on an operating system the first process stored in memory having a first process identifier assigned by the operating system;
   b. establishing an endpoint identifier for the first process;
   c. establishing an endpoint lookup table associating the endpoint identifier and the first process identifier, thereby allowing a different process to communicate with the first process using the endpoint identifier without the different process having knowledge of the first process identifier;
   d. loading the second process into memory, wherein the operating system assigns the second process a second process identifier;
   e. starting the second process;
   f. replacing in the endpoint lookup table the first process identifier associated with the endpoint identifier with the second process identifier, wherein the endpoint identifier is then associated in the endpoint lookup table with the second process identifier, and further wherein the different process now communicates with the second process through the same endpoint identifier;
   g. obtaining the second process identifier through a control process, wherein the control process updates the endpoint lookup table;
   h. instructing the first process to transmit data directly to the second process, and further wherein this step is accomplished with the aid of the control process;
   i. instructing the first process to transmit data directly to the second process; and
   j. transmitting the second process identifier to the first process, wherein the first process transmits data to the second process by means of the second process identifier, and further wherein the data received by the second process is used for updating a database of the second process, and further wherein the first process continues to process and service signals received on a first process queue after the data has begun to be transmitted to the second process and before the first process identifier is replaced by the second process identifier in the endpoint lookup table.

2. The method as in claim 1, further including the step of notifying the control process that the data has been transferred to the second process.

3. The method as in claim 2, further including the step of forwarding any remaining messages on the first process queue to a second process queue after the data has been transferred to the second.

4. The method as in claim 3, further including the step of processing messages at the second process that are found in the second process queue.

5. The method as in claim 3, further including the step of deleting the first process from memory after the endpoint lookup table has been altered.

6. An apparatus for loading code non-disruptively, comprising:
   a. a new process loaded into memory, wherein the new process comprises an endpoint identifier established during compilation and a new process identifier established by an operating system during loading;

b. a previous process loaded into memory, wherein the previous process has the same endpoint identifier as the new process, and has a previous process identifier established by the operating system that is different from the new process identifier;

c. an endpoint lookup table associating the endpoint identifier with the previous process identifier;

d. a controller instructing the endpoint lookup table to change the process identifier associated with the endpoint identifier from the previous process identifier to the new process identifier so as to perform a non-disruptive switchover from the previous process to the new process, wherein the controller transmits the new process identifier to the previous process; and e. means for sending data from the previous process to the new process, wherein the data is used by the new process for updating a new process database, and further wherein the previous process continues to process and service signals received on a previous process queue after the data has begun to be sent to the new process and before the endpoint lookup table changes the process identifier associated with the endpoint identifier.

7. The apparatus as in claim 6, further comprising means for notifying the control process that the data has been fully transferred to the new process.

8. The apparatus as in claim 7, further comprising means for forwarding any remaining messages in a previous process queue to a new process queue, in response to the data being fully transferred.

9. The apparatus as in claim 8, further including means for deleting the previous process from memory.

10. An apparatus for replacing code non-disruptively, comprising:

a. a previous process associated with an endpoint identifier;

b. a new process also associated with the endpoint identifier;

c. a process identifier generator in an operating system that generates a unique process identifier for each of the old and new processes;

d. a memory device linked to the operating system, wherein the memory device contains the old process and the new process;

e. an endpoint lookup table associating the endpoint identifier with the previous process identifier, and f. an endpoint lookup table that associates one of the process identifiers and the endpoint identifier, wherein the lookup table is in communication with the operating system; and g. a controller in communication with the memory device, the controller containing code to instruct the endpoint lookup table to replace the association between the endpoint identifier and the previous process identifier with an association between the endpoint identifier and the new process identifier to perform a non-disruptive switchover to the new process, wherein the controller instructs the previous process to send internal data used by the previous process to the new process before instructing the endpoint lookup table to replace the association between the endpoint identifier and the previous process identifier, and further wherein the previous process continues to process and service signals received on a first process queue after the internal data has begun to be transmitted to the new process and before the process identifier of the previous process is replaced by the process identifier of the new process.

11. The apparatus as in claim 10, wherein the new process is received and placed in the memory device after the previous process has already started operating.

12. The apparatus as in claim 11, wherein the data of the previous process is used by the new process to populate a database.

* * * * *